UNITED STATES PATENT OFFICE.

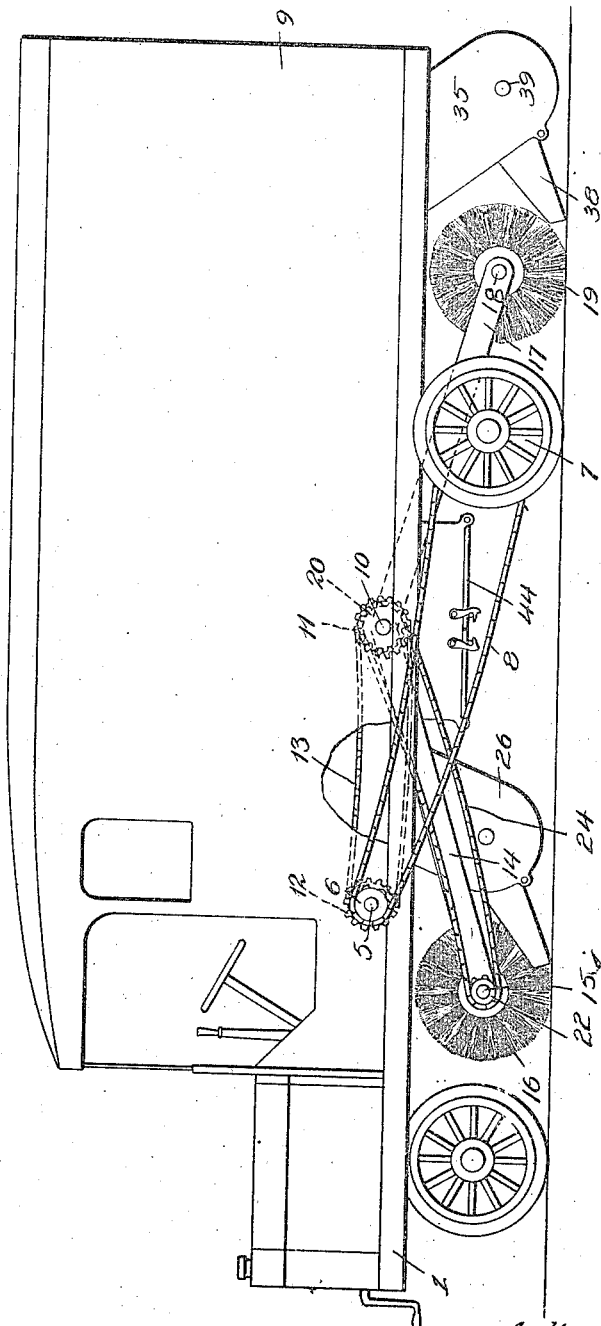

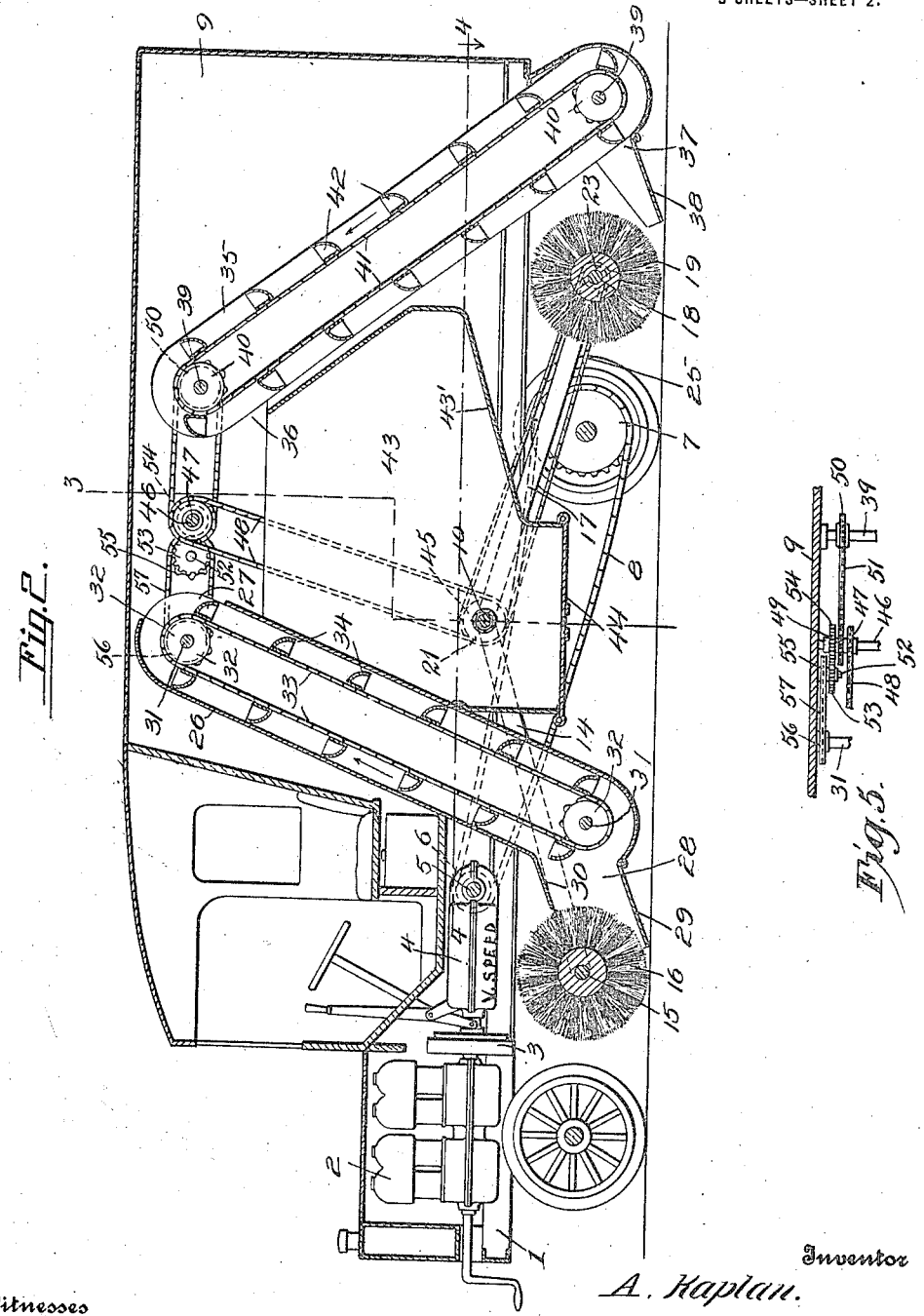

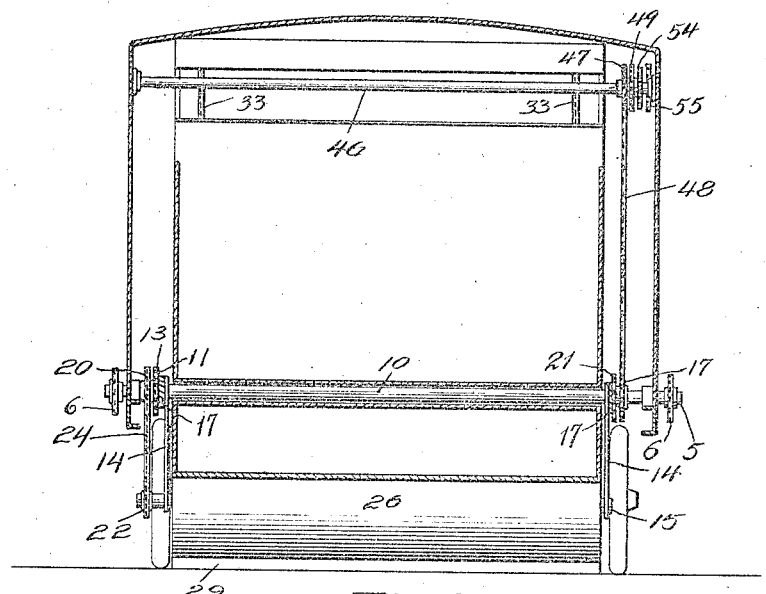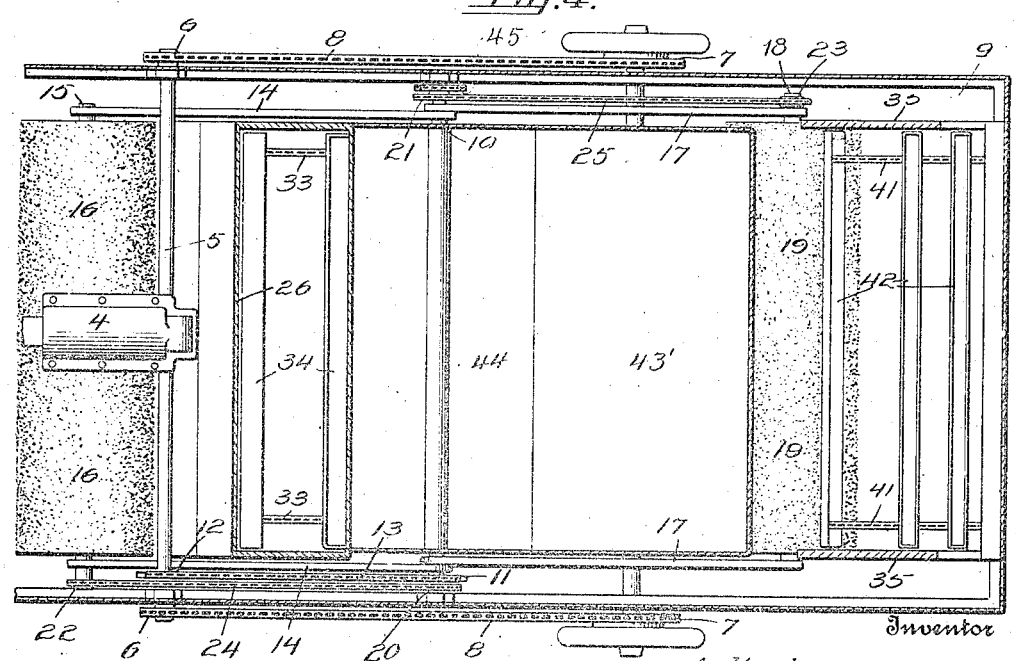

ABRAHAM KAPLAN, OF BROOKLYN, NEW YORK.

STREET-SWEEPING MACHINE.

1,238,681.

Specification of Letters Patent.

Patented Aug. 28, 1917.

Application filed August 26, 1915. Serial No. 47,471.

*To all whom it may concern:*

Be it known that I, ABRAHAM KAPLAN, a subject of the Emperor of Russia, residing at Brooklyn, in the county of Kings and State of New York, have invented new and useful Improvements in Street-Sweeping Machines, of which the following is a specification.

This invention relates to improvements in street sweeping machines and, in the present instance, is directed particularly to a self-propelled street sweeping machine.

In carrying out the present invention, it is my purpose to provide a machine of the class described wherein the sweeper brushes will be suspended from the body of the vehicle adjacent to the front and rear ends respectively so as to insure the proper cleaning of the roadway and wherein the dirt and refuse swept up by the brushes will be delivered to conveyers disposed behind the respective brushes and acting to carry the dirt and refuse from the brushes into the body of the vehicle so that the refuse may be collected automatically by the machine as the latter is operated over the roadway.

With the above and other objects in view, the invention consists in the construction, combination and arrangement of parts hereinafter set forth in and falling within the scope of the claim.

In the accompanying drawings:

Figure 1 is a view in side elevation of a street sweeping machine constructed in accordance with the present invention.

Fig. 2 is a longitudinal sectional view through the machine.

Fig. 3 is a vertical cross sectional view therethrough.

Fig. 4 is a horizontal sectional view through the machine.

Referring now to the drawings in detail, 1 designates the chassis of a motor vehicle, while 2 indicates the internal combustion engine mounted upon the forward end of the chassis 1 and connected through the medium of a clutch 3 with the main shaft of the variable speed transmission gear system 4. In the present instance, the transmission gear set 4 is arranged immediately behind the clutch 3 and the rear end of the main shaft of such gear set is connected with a transverse shaft 5 journaled in horizontally alining bearings carried by the side beams of the chassis. Keyed upon the outer extremities of the transverse shaft 5 are sprocket wheels 6 and trained over the sprocket wheels 6 and sprocket wheels 7 fixed upon the rear axle of the vehicle are chains 8 whereby the vehicle may be propelled by the internal combustion engine 2. Mounted upon the chassis 1 behind the engine 2 is a body 9 comprising side and end walls and a top wall carried by the upper edges of the side and end walls. The forward end portion of the body 9, in advance of the end wall, is equipped with an operator's seat adapted to accommodate the operator of the vehicle and disposed within the reach of the operator on the seat are various controlling devices of the vehicle, as usual.

Journaled in horizontally alining bearings carried by the side bars of the chassis is a transverse shaft 10 disposed behind the shaft 5 and fast upon the shaft 10 adjacent to one end thereof is a sprocket wheel 11, while fast upon the corresponding portion of the transverse shaft 5 is a sprocket wheel 12 and trained over the sprocket wheels 11 and 12 is an endless chain 13 whereby the shaft 10 may be driven from the shaft 5. Loosely mounted upon the ends of the shaft 10 and projecting toward the forward extremity of the vehicle are downwardly extending arms 14 disposed at the opposite sides of the vehicle and rotatably mounted within the lower end portions of the arms 14 is a shaft 15 carrying a brush 16 arranged transversely of the vehicle and adapted to sweep the roadway. Also loosely mounted upon the respective ends of the shaft 10 are arms 17 projecting toward the rear end of the chassis and extending downwardly and disposed at the opposite sides of the vehicle. Rotatably mounted within the lower ends of the arms 17 is a shaft 18 carrying a brush 19 disposed transversely of the vehicle and adapted to sweep the roadway. In the present instance, the driving mechanism for the brushes 16 and 19 comprises sprocket wheels 20 and 21 keyed upon the shaft 10 adjacent to the respective ends thereof, and sprocket wheels 22 and 23 keyed upon the corresponding ends of the shafts 15 and 18 respectively. Over the sprocket wheels 20 and 22 is trained an endless chain 24, while over the sprocket wheels 21 and 23 is trained an endless chain 25 and these chains 24 and 25 serve to revolve the brushes over the roadway when the shaft 10 is driven from the motor. Fixed in the body 9 is a conveyer casing 26 projecting below the chassis 1 and having the lower end thereof terminating immediately behind the front sweeper brush 16. This casing 26 is inclined and formed in the upper end of the casing is a discharge opening 27, while formed in the lower end of the casing immediately behind the brush 16 is an inlet opening 28 and pivoted to the bottom wall of the inlet opening 28 and projecting toward the brush 16 is a dirt pan 29 adapted to engage the surface of the roadway and to receive the dirt and refuse swept up by the brush 16. The top wall of the opening 28 is formed with an outwardly projecting dust guard 30 acting to direct the dust into the casing 26 in the rotation of the brush 16. Journaled in the opposite side walls of the casing 26 adjacent to the top and bottom ends thereof respectively are shafts 31, and secured to the shafts 31 are sprocket wheels 32. Over these wheels 32 is trained an endless conveyer chain 33 and secured to the conveyer chain 33 are spaced buckets 34. Also secured within the body 9 is a conveyer casing 35 inclined in a direction opposite to the casing 26 and having the lower end thereof projecting below the chassis 1 at the rear of the sweeper brush 19 and formed in the upper end of the casing 35 is a discharge opening 36, while formed in the lower end of such casing is an inlet opening 37 arranged immediately behind the brush 19. Pivoted to the lower wall of the inlet opening 37 and projecting toward the brush 19 is a dirt pan 38 adapted to receive the dirt and refuse from the brush 19. Journaled in the opposite side walls of the casing 35 adjacent to the top and bottom ends thereof respectively are horizontal shafts 39, and mounted upon the shafts 39 are sprocket wheels 40, while trained over the sprocket wheels 40 is an endless conveyer chain 41. Fixed to the conveyer chain 41 and spaced apart thereon equal distances are buckets 42 adapted to receive the dirt thrown into the casing by the brush 19 through the inlet opening 37 and to convey such dirt to the upper end of the casing and discharge the same through the outlet opening 36. The outlet openings 27 and 36 in the respective conveyer casings face each other, and suitably fastened within the body 9 between the conveyer casings 26 and 35 is an open top dirt receptacle 43 having its bottom 43′ provided with a discharge opening 43 adjacent the front wall of the receptacle normally closed by means of hinged doors 44 capable of swinging movement to open position to release dirt and refuse in the receptacle.

The bottom of the receptacle 43 inclines upwardly and rearwardly from the discharge opening therein toward the rear end wall of the receptacle and receives thereon the dirt discharged into the receptacle by the cups on the conveyer chain 41, while the cups on the conveyer chain 33 discharge their contents upon the doors 44.

Fixed to the shaft 10 adjacent the sprocket wheel 21 is a sprocket wheel 45, while fixed to a shaft 46 extending transversely of the body 9 between the shafts 31 and 39 is a sprocket wheel 47 over which and the sprocket wheel 45 is trained an endless chain 48. The shaft 46 has mounted thereon a sprocket wheel 49 over which and a sprocket wheel 50 on the shaft 39 is trained a chain 51. Mounted in one of the side walls of the casing 9 is a stub shaft 52 on which is mounted a gear wheel 53 meshing with a gear wheel 54 on the shaft 46. The stub shaft 52 carries a sprocket wheel 55 over which and a sprocket 56 on the shaft 31 is trained a chain 57. Through the above described arrangement of the gear wheels 53 and 54 and the chains 51 and 57, it will be seen that the conveyers may be simultaneously operated to deliver the refuse collected thereby into the receptacle 43.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

In a device of the class described, a wheeled body having a frame, a dirt receptacle within said body, a driven shaft carried by the frame of the wheeled body and passing through said dirt receptacle and extending beyond the sides thereof, oppositely extending arms fulcrumed upon the extending portions of said driven shaft and extending beyond the sides of the dirt receptacle, brushes rotatably mounted in said arms, means for rotating said brushes connected therewith and the driven shaft, means for driving said driven shaft, and a separate conveyer for each brush to convey the dirt to the common dirt receptacle.

In testimony whereof I affix my signature in presence of two witnesses.

ABRAHAM KAPLAN.

Witnesses:
HYMAN KAPLAN,
HARRY EISENBERG.

Correction in Letters Patent No. 1,238,681.

It is hereby certified that in Letters Patent No. 1,238,681, granted August 28, 1917, upon the application of Abraham Kaplan, of Brooklyn, New York, for an improvement in "Street-Sweeping Machines," an error appears in the printed specification requiring correction as follows: Page 1, line 3, for the words "subject of the Emperor of Russia" read *a citizen of the United States;* and that the said Letters Patent should be read with this correction therein that the same may conform to the record of the case in the Patent Office.

Signed and sealed this 25th day of September, A. D., 1917.

[SEAL.]

F. W. H. CLAY,

*Acting Commissioner of Patents.*

Cl. 15—17.